(12) United States Patent
Lin

(10) Patent No.: US 10,866,177 B1
(45) Date of Patent: Dec. 15, 2020

(54) DROPPING TEST DEVICE

(71) Applicant: TRIPLE WIN TECHNOLOGY(SHENZHEN) CO. LTD., Shenzhen (CN)

(72) Inventor: Zhen-Sheng Lin, Shenzhen (CN)

(73) Assignee: TRIPLE WIN TECHNOLOGY(SHENZHEN) CO. LTD., Shenzhen (CN)

( * ) Notice: Subject to any disclaimer, the term of this patent is extended or adjusted under 35 U.S.C. 154(b) by 0 days.

(21) Appl. No.: 16/691,807

(22) Filed: Nov. 22, 2019

(30) Foreign Application Priority Data

Oct. 8, 2019 (CN) .................. 2019 2 1699347 U

(51) Int. Cl.
*G01N 3/303* (2006.01)
*G01N 3/30* (2006.01)

(52) U.S. Cl.
CPC .............. *G01N 3/303* (2013.01); *G01N 3/30* (2013.01); *G01N 2203/001* (2013.01); *G01N 2203/0033* (2013.01); *G01N 2203/0037* (2013.01); *G01N 2203/0282* (2013.01); *G01N 2203/0447* (2013.01)

(58) Field of Classification Search
CPC .. G01N 3/303; G01N 3/30; G01N 2203/0447; G01N 2203/001; G01N 2203/0282; G01N 2203/0037; G01N 2203/0033
See application file for complete search history.

(56) References Cited

U.S. PATENT DOCUMENTS

| 2,422,317 | A | * | 6/1947 | Stock | ........................ | G01N 3/30 73/12.14 |
| 2016/0011088 | A1 | * | 1/2016 | Guthrie | ..................... | G01N 3/48 73/12.13 |
| 2017/0299461 | A1 | * | 10/2017 | Yang | ...................... | G01N 3/303 |

* cited by examiner

*Primary Examiner* — Jonathan M Dunlap
(74) *Attorney, Agent, or Firm* — ScienBiziP, P.C.

(57) ABSTRACT

A dropping test device includes a base, a lifting assembly formed on the base, a resetting component, and a transmission assembly. A to-be-detected component is formed on the base. The lifting assembly includes at least one cantilever, at least one cam, and a rotating shaft. The cantilever and the cam are fixed on the rotating shaft. The rotating shaft drives the cantilever and the cam rotates. The cantilever lifts one end of the to-be-detected component during rotating. The resetting component abuts on the cam. The cam drives the resetting component towards the to-be-detected component as the cam is rotating. The resetting component drives the to-be-detected component to return to an original position. The transmission assembly is connected to the rotating shaft and drives the rotating shaft to rotate.

15 Claims, 13 Drawing Sheets

DROPPING TEST DEVICE

FIELD

The subject matter of the application generally relates to a dropping test device.

BACKGROUND

Electronic devices, such as mobile phones and tablet computers, need to undergo a dropping test before leaving a manufacturing factory. The dropping test is used to verify a reliability of various modules of the electronic devices.

A dropping test device generally includes a plurality of air cylinders and a plurality of clamps. The air cylinders can drive the clamps to hold the electronic devices during the dropping test. Thus, the dropping test device may have a complex structure due to the air cylinders.

Therefore, there is room for improvement in the art.

BRIEF DESCRIPTION OF THE DRAWINGS

Implementations of the present disclosure will now be described, by way of embodiments, with reference to the attached figures.

DETAILED DESCRIPTION

Figure 1:
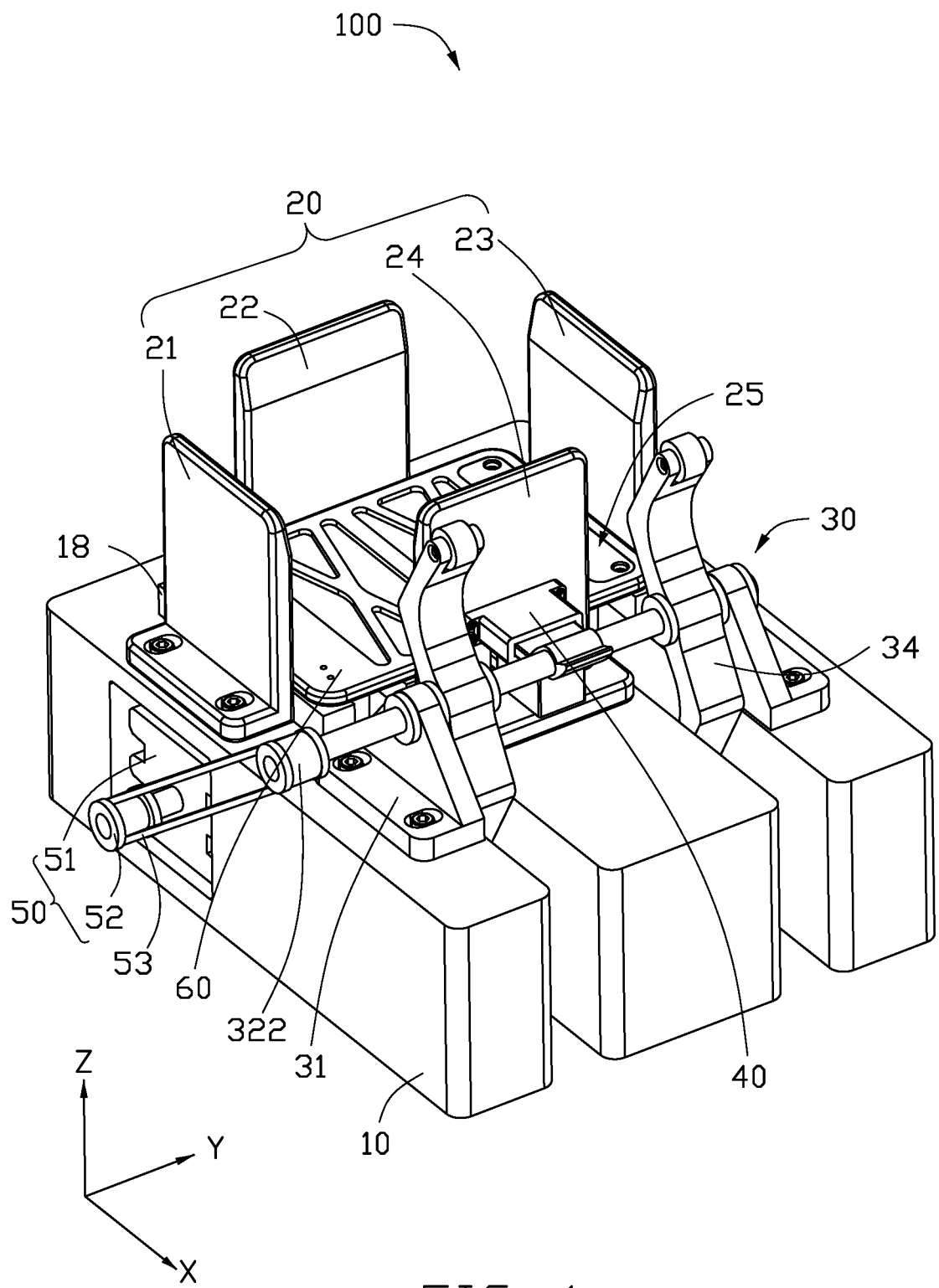
FIG. 1 is a perspective view of an embodiment of a dropping test device with a to-be-detected component according to the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain portions may be exaggerated to better illustrate details and features of the present disclosure.

The disclosure is illustrated by way of example and not by way of limitation in the figures of the accompanying drawings, in which like references indicate similar elements. It should be noted that references to "an" or "one" embodiment in this disclosure are not necessarily to the same embodiment, and such references mean "at least one."

The term "comprising," when utilized, means "including, but not necessarily limited to"; it specifically indicates open-ended inclusion or membership in the so-described combination, group, series, and the like.

FIGS. 1-6 show an embodiment of a dropping test device 100. The dropping test device 100 is used to perform a dropping test on a to-be-detected component 60. The dropping test device 100 includes a base 10, a limiting component 20, a lifting assembly 30, a resetting component 40, and a transmission assembly 50. The limiting component 20 is fixed on the base 10. The lifting assembly 30 is fixed on the base 10. The lifting assembly 30 includes at least one cantilever 34, at least one cam 33, and a rotating shaft 32. The cantilever 34 and the cam 33 are fixed on the rotating shaft 32. The cantilever 34 and the cam 33 rotate with the rotating shaft 32. During rotating, the to-be-detected component 60 is lifted by the rotating shaft 32 and then dropped. The resetting component 40 is connected to the lifting assembly 30. The transmission assembly 50 is connected to the cantilever 34.

When the to-be-detected component 60 is fixed on the base 10, the transmission assembly 50 drives the cantilever 34 to rotate, the cantilever 34 touches one end of the to-be-detected component 60 and lifts the end of the to-be-detected component 60, the cantilever 34 still rotates until the cantilever 34 leave from the to-be-detected component 60, the to-be-detected component 60 drops, the cantilever 34 drives resetting component 40 to rotate, and the resetting component 40 drives the to-be-detected component 60 to return to an original position. Repeating the above process, thereby performing multiple dropping tests on the to-be-detected component 60. The to-be-detected component 60 is returned to the original position by the resetting component 40, thereby the to-be-detected component 60 can be periodically adjusted to the original position.

The to-be-detected component 60 can be various flat-shaped devices such as a mobile phone and a table computer. In at least one embodiment, the to-be-detected component 60 is a table computer.

Figure 2:
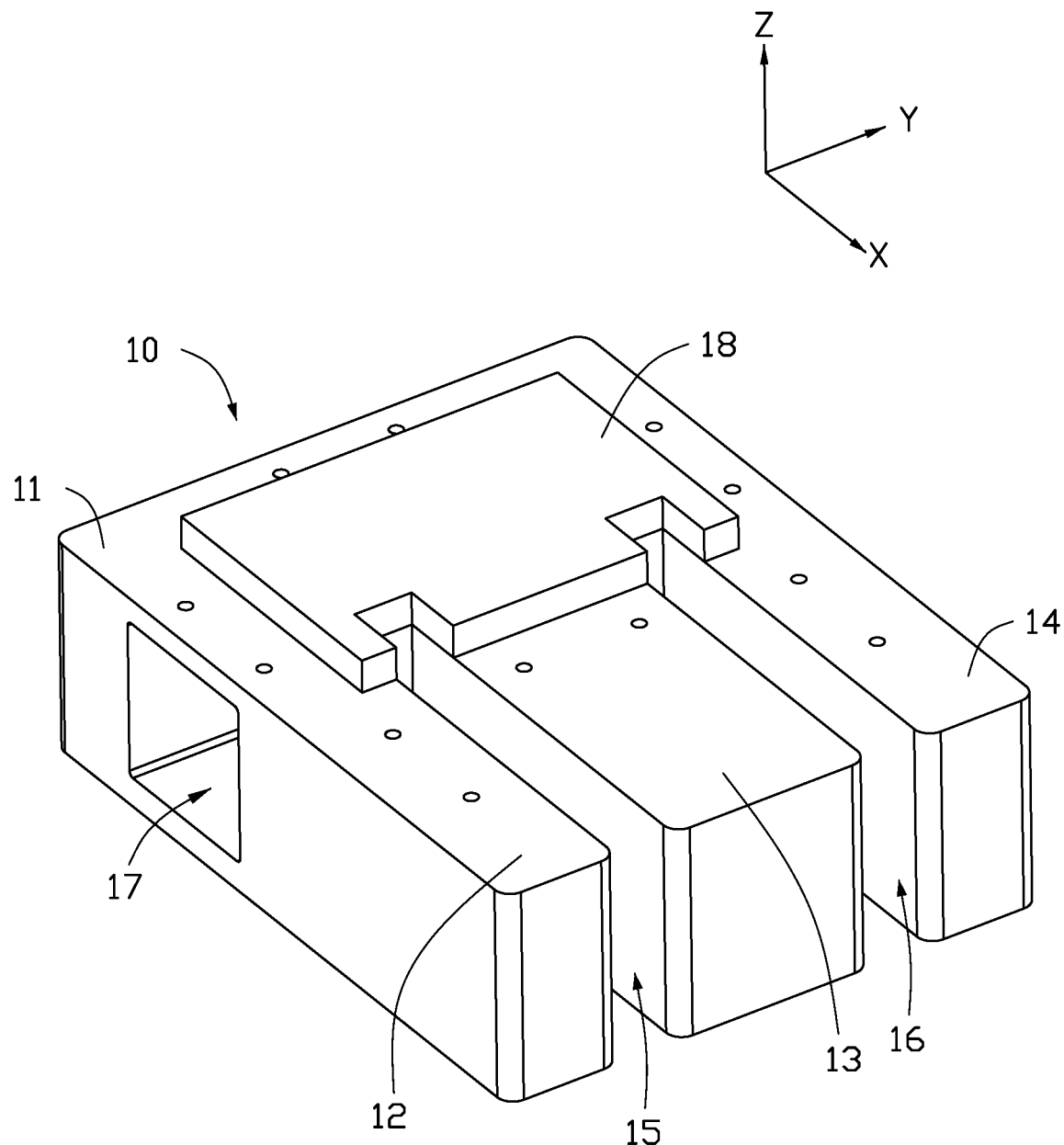
FIG. 2 is a perspective view of a bottom plate formed on a base of the dropping test device of FIG. 1.

Referring to FIGS. 1-2, the base 10 is substantially a rectangular parallelepiped. For convenience of description, defining length, width, and height directions of the rectangular parallelepiped are X-axis direction, Y-axis direction, and Z-axis direction, respectively. In other embodiments, the base 10 can be any other shape.

The base 10 includes a bearing portion 11, a first support portion 12, a second support portion 13, and a third support portion 14. The first support portion 12, the second support portion 13, and the third support portion 14 extend from one side of the bearing portion 11 along the X-axis direction. The second support portion 13 are located between the first support portion 12 and the third support portion 14. A first groove 15 is defined by the bearing portion 11, the first support portion 12, and the second support portion 13. A second groove 16 is defined by the bearing portion 11, the second support portion 13, and the third support portion 14. The first groove 15 and the second groove 16 are used to provide a rotating space for the cantilever 34.

In other embodiments, the first support portion 12 and the third support portion 14 can be omitted.

The base 10 further includes a bottom plate 18. The bottom plate 18 is formed on the first support portion 12. The bottom plate 18 is used to bear the to-be-detected component 60. The bottom plate 18 is set flexibly according to a size of the to-be-detected component 60. In at least one embodiment, the bottom plate 18 is fixed on the bearing portion 11 and partially formed on the first support portion 12, the second support portion 13, and the third support portion 14. That is, when the to-be-detected component 60 is fixed on the bottom plate 18, a part of the to-be-detected component 60 extends into the first groove 15 and the second groove 16, so that when the cantilever 34 rotates, the to-be-detected component 60 can be lifted by the rotating shaft 32.

1. Referring to FIGS. 1-2, the limiting component 20 is fixed on the base 10 and surrounds the bottom plate 18. The limiting component 20 is used to limit the to-be-detected component 60. The limiting component 20 includes a plurality of limiting plates, the plurality of limiting plates defines a receiving space 25, the to-be-detected component 60 is received in the receiving space 25 and formed on the bottom plate 18.

In at least one embodiment, the limiting component 20 includes four limiting plates, which are respectively named as a first limiting plate 21, a second limiting plate 22, a third limiting plate 23, and a fourth limiting plate 24. The first limiting plate 21, the second limiting plate 22, the third limiting plate 23, and the fourth limiting plate 24 are fixed on the base 10, surround the bottom plate 18, and define a receiving space 25. The receiving space 25 is used to receive and limit the to-be-detected component 60. The first limiting plate 21 faces the third limiting plate 23. The first limiting plate 21 and the third limiting plate 23 are parallel to each other and parallel to the X-axis direction. The second limiting plate 22 faces the fourth limiting plate 24. The second limiting plate 22 and the fourth limiting plate 24 are parallel to each other and parallel to the Y-axis direction. In at least one embodiment, the first limiting plate 21, the second limiting plate 22, and the third limiting plate 23 are formed on the bearing portion 11, and the fourth limiting plate 24 is formed on the second support portion 13.

In at least one embodiment, the limiting component 20 is detachably fixed to the base 10 by a bolt. In other embodiments, fixing manners of the limiting component 20 is not limited.

The limiting member 20 can be flexibly set according to the size of the to-be-detected component 60.

The base 10 further includes a third groove 17. The third groove 17 is defined in the bearing portion 11 along the Y-axis direction. The third groove 17 is used to receive the transmission assembly 50.

The transmission assembly 50 includes a motor 51 and a driving rod 52 connected to the motor 51. The driving rod 52 extends along the Y-axis direction and protrudes out of the third groove 17. The driving rod 52 is connected to the cantilever 34.

The transmission assembly 50 is an electric drive, which replaces a cylinder drive in a conventional technology, and avoids a need to be additionally connect to a gas path during the dropping test. Meanwhile, the motor 51 has a simple and optimized structure, thereby reducing cost.

In other embodiments, the transmission assembly 50 can be located elsewhere, as long as the transmission assembly 50 can rotate the cantilever 34.

Figure 3:
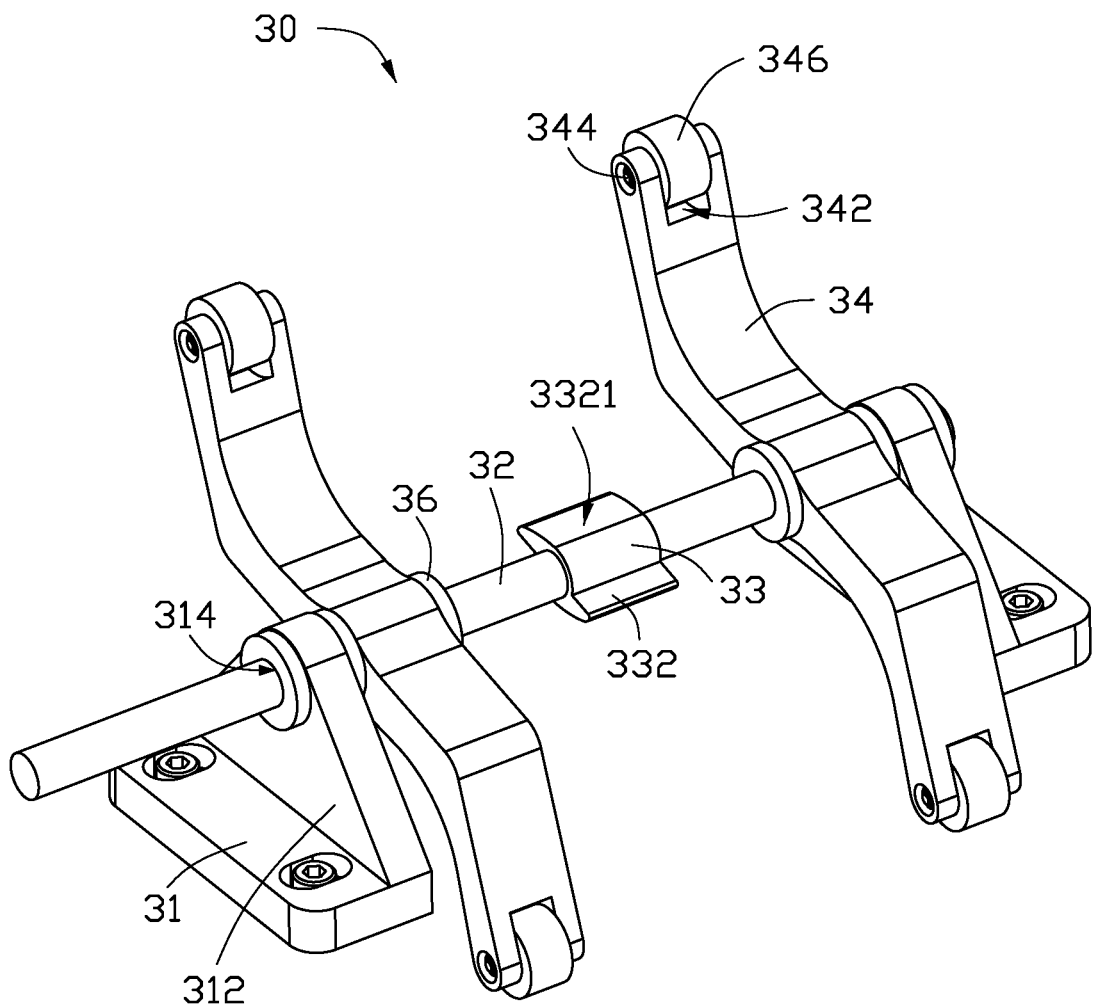
FIG. 3 is a perspective view of a lifting assembly of the dropping test device of FIG. 1.

Referring to FIGS. 1-3, the lifting assembly 30 further includes at least one fixing support 31. In at least one embodiment, the lifting assembly 30 includes two fixing supports 31. In at least one embodiment, the two fixing support 31 are respectively fixed on the first support portion 12 and the third support portion 14. Each of the two fixing support 31 includes a supporting frame 312 extending along the Z-axis direction. A through hole 314 is defined in the supporting frame 312 and extends along the Y-axis direction. The rotating shaft 32 is received and rotatable in the through hole 314.

The lifting assembly 30 further includes a plurality of fixed blocks 36 sleeved on the rotating shaft 32. The fixed blocks 36 is formed on two sides of the cantilever 34 and two sides of the supporting frame 312. The fixed blocks 36 can rotate with the rotating shaft 32. The two fixed blocks 36 are used to prevent the cantilever 34 from moving on the rotating shaft 32 along the Y-axis direction and prevent the rotating shaft 32 from moving along the Y-axis direction.

In other embodiments, the two fixing support 31 can be fixed on the second support portion 13, so the first support portion 12 and the third support portion 14 can be omitted.

A driven rod 322 is formed on one end of the rotating shaft 32. The driven rod 322 is connected to the driving rod 52 by a driving belt 53. The motor 51 drives the driving rod 52 to rotate, the driving belt 53 rotates with the driving rod 52, the driving belt 53 drives the driven rod 322 to rotate, and the driven rod 322 drives the rotating shaft 32 to rotate.

The cantilever 34 is fixed on the rotating shaft 32. The cantilever 34 is a centrally symmetric component with the rotating shaft 32 as a center. That is, the cantilever 34 rotates 180° and then coincides with the original position, so that the rotating shaft 32 can realize two dropping tests every rotation.

Figure 11:
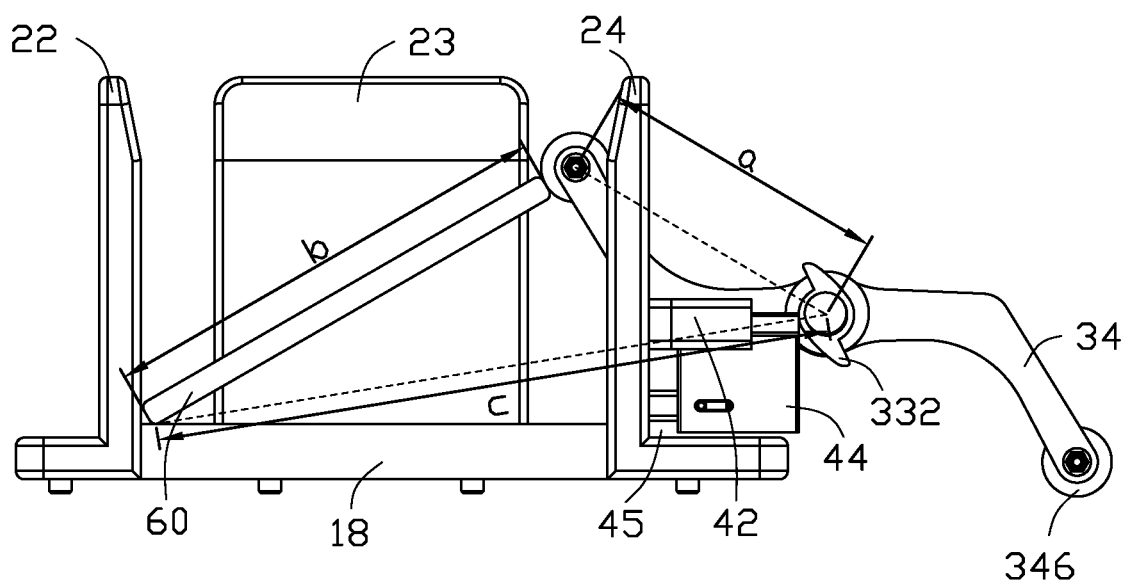
FIG. 11 is a perspective view showing the cantilever lifts the to-be-detected component to a vertex after the rotating shaft rotates.

Referring to FIG. 11 together, it is defined that a half of a length of the cantilever 34 (i.e., a rotational radius of the cantilever 34) is a, and a length of the to-be-detected component 60 along the X-axis direction is b, and a distance between the second limiting plate 22 and the rotating shafts 32 is c, and a+b>c is satisfied.

A gap 342 is defined in each end of the cantilever 34. An idler wheel 346 is received in the gap 342. The idler wheel 346 is connected to the cantilever 34 by a connecting rod 344. The idler wheel 346 is rotatable along the connecting rod 344 and the Y-axis direction. The idler wheel 346 can reduce friction between the cantilever 34 and the to-be-detected component 60, thereby reducing wear and noise. In at least one embodiment, the material of the roller 346 is plastic.

The cam 33 is formed on the rotating shaft 32 and located between two of the cantilevers 34. The cam 33 includes two opposite bulges 332. The two opposite bulges 332 is a center symmetrical component with the rotating shaft 32 as a center. Each of the two opposite bulges 332 includes an arc surface 3321. The two opposite bulges 332 push the resetting component 40 through the arc surface 3321 to make the to-be-detected component 60 fall back to its initial position. When the to-be-detected component 60 is on its initial position, the to-be-detected component 60 abuts on the second limiting plate 22.

Figure 7:
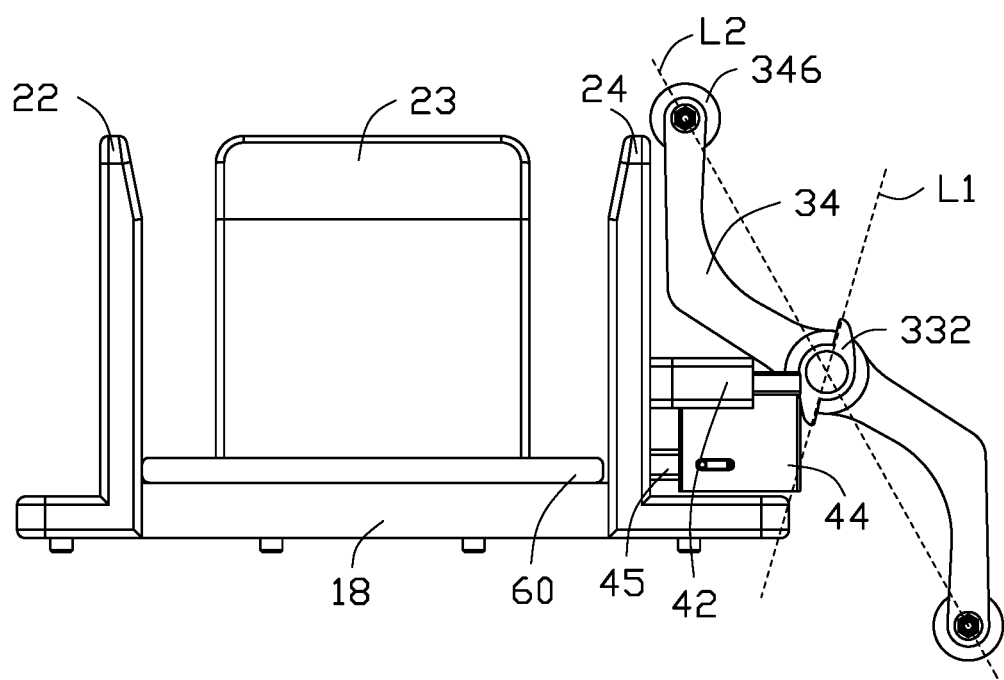
FIG. 7 is a perspective view of the dropping test device with the to-be-detected component in an initial state.

Referring to FIG. 7, a first extending direction L1 of the two opposite bulges 332 is intersected to a second extending direction L2 of the cantilever 34. The cantilever 34 and the cam 33 are fixed with the rotating shaft 32, so that, a transmission assembly 50 can drive the lifting assembly 30 and the resetting component 40 to operate together.

Figure 4:
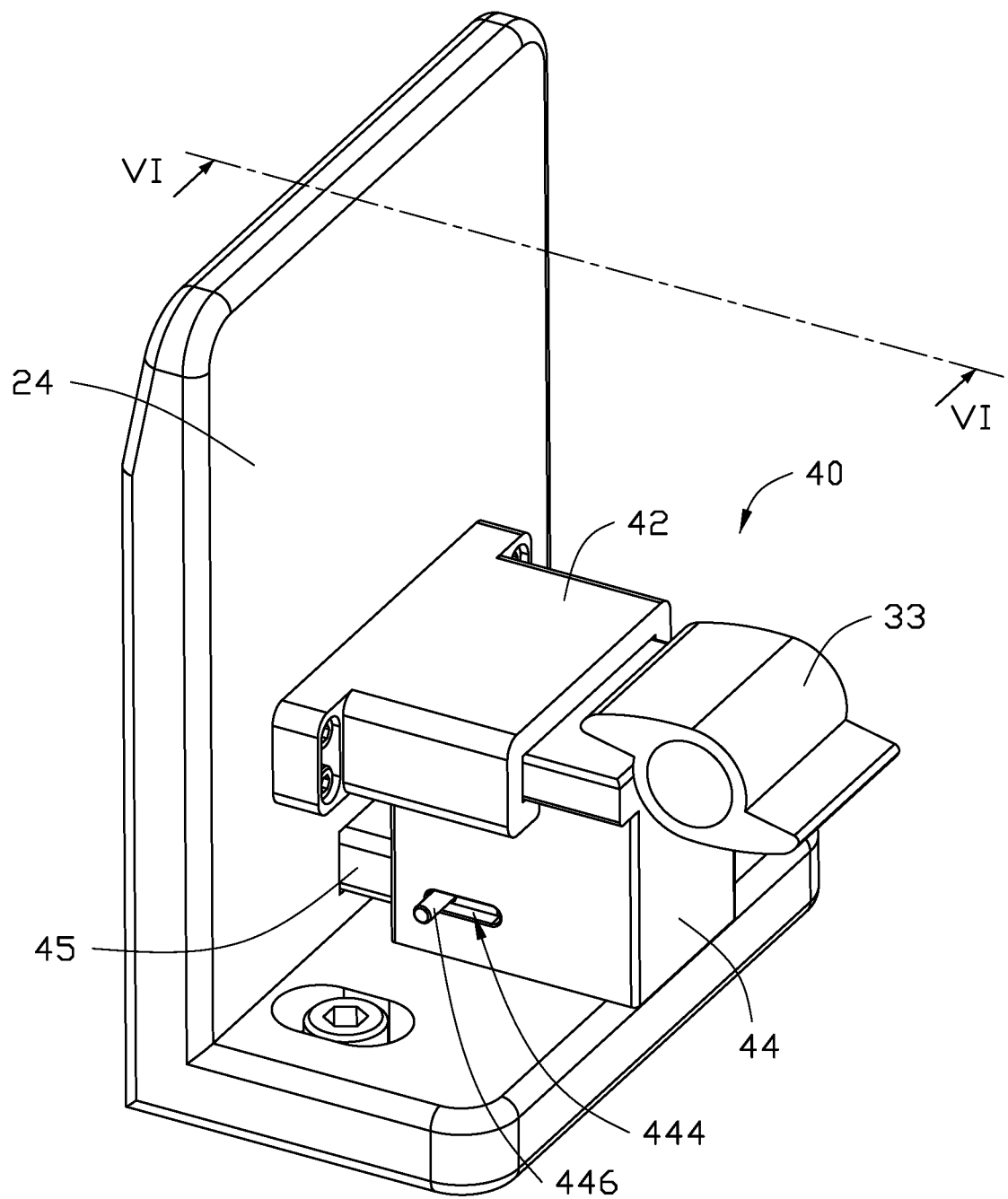
FIG. 4 is a perspective view showing a resetting component on a fourth limiting plate and abuts a cam of the dropping test device of FIG. 1.
Figure 5:
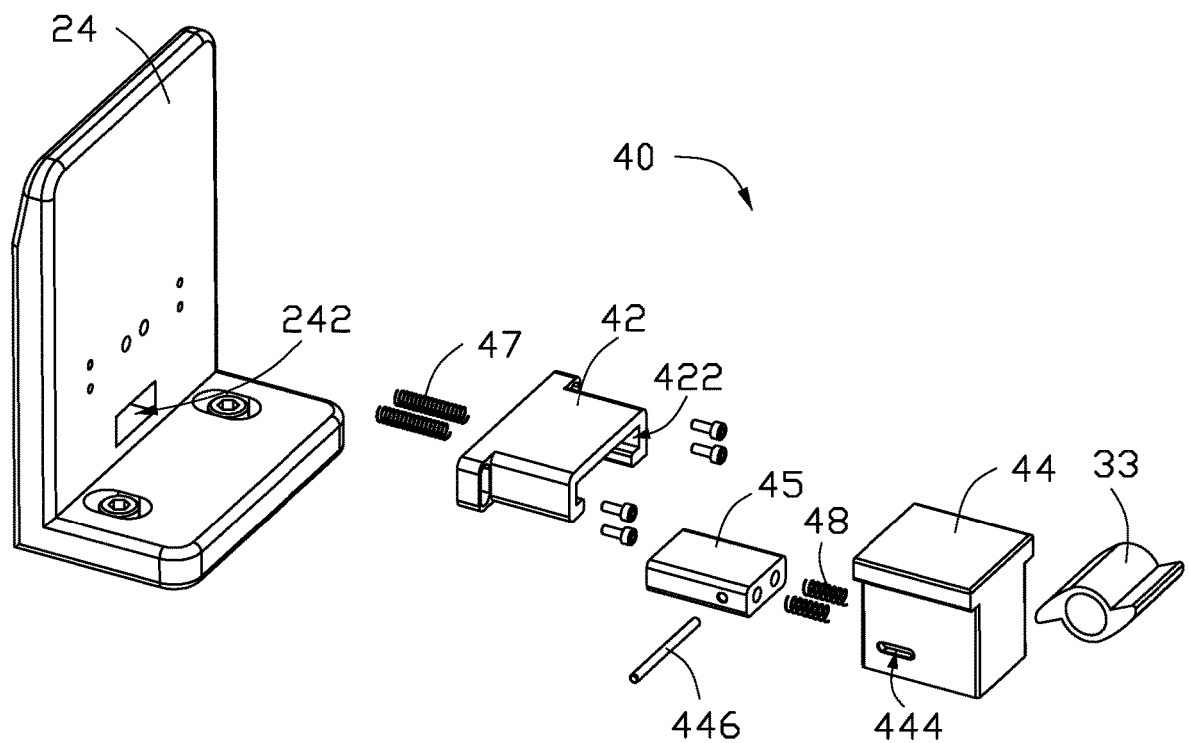
FIG. 5 is an exploded view of the resetting component, the fourth limiting plate, and the cam of FIG. 4.
Figure 6:
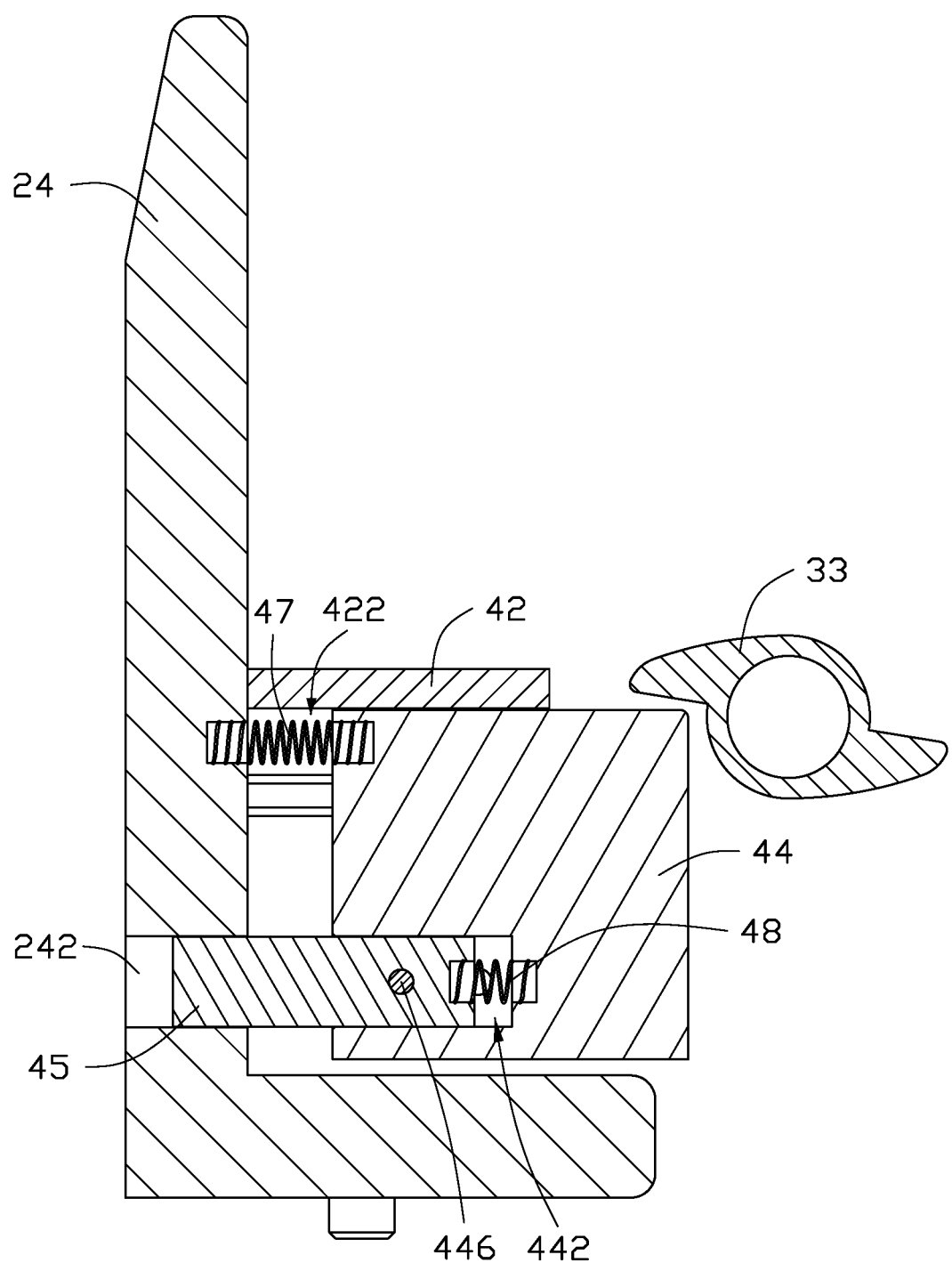
FIG. 6 is a cross-section view along line VI-VI of FIG. 4.

Referring to FIGS. 4-6, the resetting component 40 includes a guiding block 42, an active block 44, and a pushing block 45. The guiding block 42 is fixed on the fourth limiting plate 24. The active block 44 is elastically connected to the fourth limiting plate 24. One end of the pushing block 45 is elastically connected to the active block 44 and the other end of the pushing block 45 is received in the fourth limiting plate 24. The pushing block 45 is capable of being driven to move in the fourth limiting plate 24 by the active block 44.

In at least one embodiment, the guiding block 42 is detachably fixed on the fourth limiting plate 24 by bolts. In other embodiments, guiding manners of the guiding block 42 is not limited.

A first guiding groove 422 is defined in the guiding block 42. In at least one embodiment, the first guiding groove 422 extends along the X-axis direction. A portion of the active block 44 is received and movable in the first guiding groove 422. The first guiding groove 422 guide the active block 44 to move along the X-axis direction.

The active block 44 is elastically connected to the fourth limiting plate 24 by a first elastic component 47. One end of the first elastic component 47 is fixed in the active block 44 and the other end is fixed in fourth limiting plate 24. In at least one embodiment, the first elastic component 47 is a spring. After the cam 33 pushes the active block 44 to move along the first guiding groove 422 in a first direction, the first elastic component 47 pushes the active block 44 to move in a direction opposite to the first direction to be reset.

A first receiving groove 442 is defined in the active block 44. The receiving groove 442 extends along the X-axis direction and faces the fourth limiting plate 24. A second receiving groove 242 is defined in the fourth limiting plate 24. The second receiving groove 242 extends through the fourth limiting plate 24 and faces the first receiving groove 442. A portion of the pushing block 45 is received in the first receiving groove 442, and the other portion of the pushing block 45 protrudes out of the first receiving groove 442 and is received in the second receiving groove 242. The pushing block 45 can be moved along the X-axis direction with the active block 44 and protrudes from the second receiving groove 242, thereby pushing the to-be-detected component 60 to its initial position.

The pushing block 45 is elastically connected to the active block 44 by a second elastic component 48. In at least one embodiment, the second elastic component 48 is a spring. When the pushing block 45 contacts the to-be-detected component 60, the second spring 48 changes a rigid contact between the pushing block 45 and the to-be-detected component 60 into a flexible contact to serve as a buffer.

A second guiding groove 444 is defined in the active block 44. The second guiding groove 444 extends through the active block 44 and extends along the Y-axis direction. The second guiding groove 444 is connected to the first receiving groove 442.

The active block 44 further includes a limiting rod 446. The limiting rod 446 extends through the pushing block 45 and protrudes out of the pushing block 45 along the Y-axis direction. The limiting rod 446 protruding out of the active block 44 is received in the second guiding groove 444 and protrudes out of the active block 44. The limiting rod 446 and the second guiding groove 444 cooperate to limit a moving distance of the pushing block 45 in the X-axis direction.

In order to more clearly explain a connection relationship between the components of the present embodiment, a process of testing the to-be-detected component 60 by the dropping test device 100 provided by the present embodiment will be described in detail below.

Firstly, referring to FIG. 7, the to-be-detected component 60 is put on the bottom plate 18, and the lifting assembly 30 and the resetting component 40 are all in an initial position.

Figure 8:
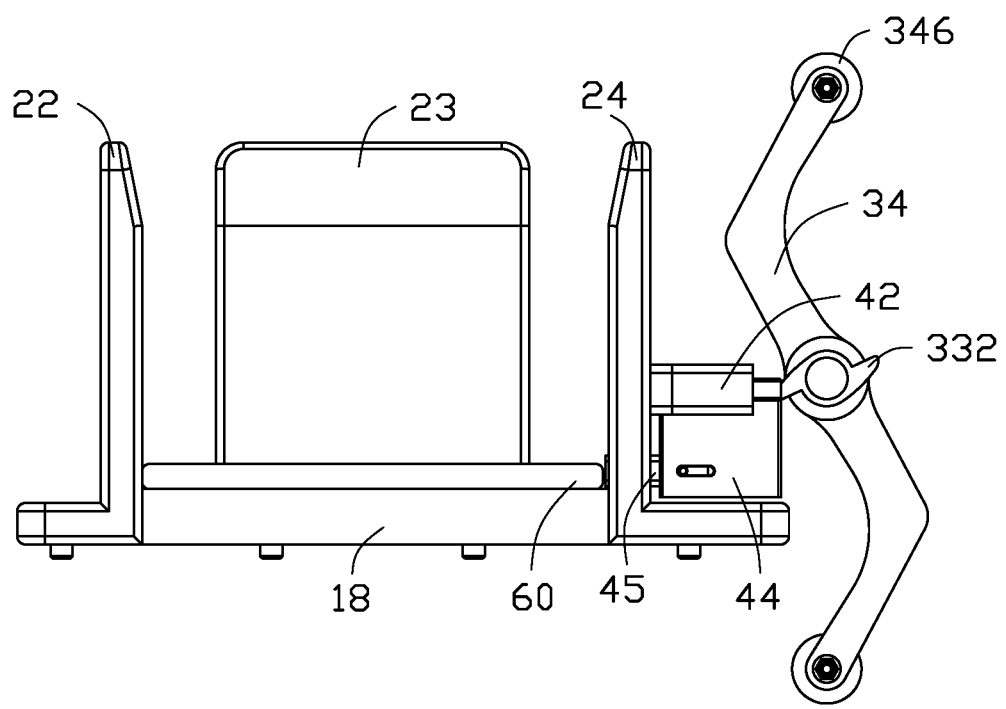
FIG. 8 is a perspective view showing the cam abuts the resetting component after a rotating shaft rotates.

Secondly, referring to FIG. 8, the motor 51 is started to work, the motor 51 drives the rotating shaft 32 to rotate, the cam 33 rotates with the rotating shaft 32 until the bulge 332 contacts the active block 44, the cam 33 continues to rotate with the rotating shaft 32, the bulge 332 pushes the active block 44 to move towards the fourth limiting plate 24, the active block 44 drives the pushing block 45 to move towards the fourth limiting plate 24, protrudes out of the second receiving groove 242, abuts on the to-be-detected component 60, and pushes the to-be-detected component 60 to its original position.

Figure 9:
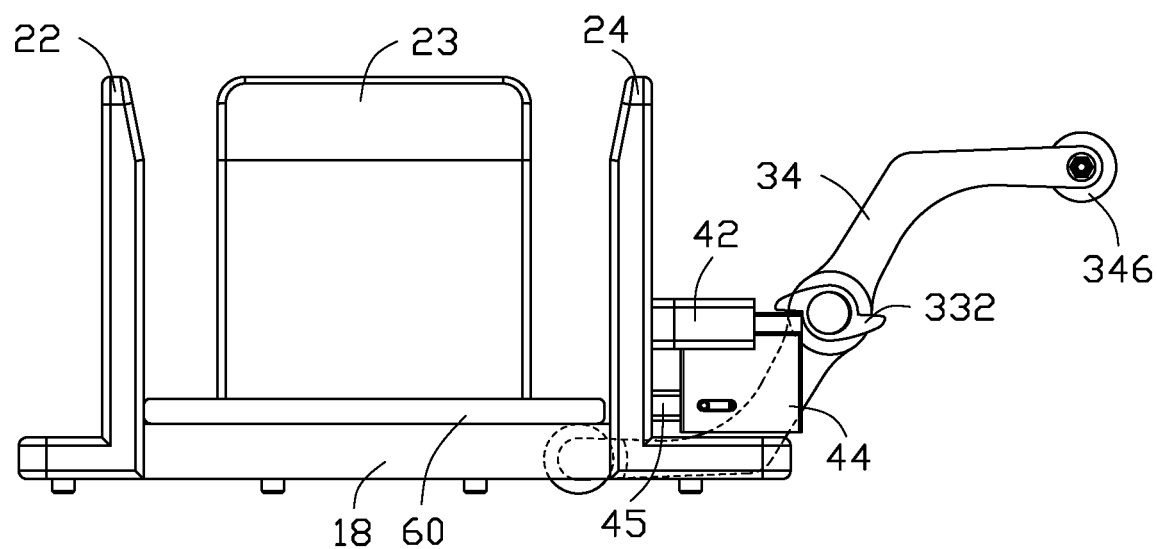
FIG. 9 is a perspective view showing the cam remains away from the resetting component and a cantilever touches the component to be tested after the rotating shaft rotates.

Thirdly, referring to FIG. 9, the rotating shaft 32 continues to rotate, the bulge 332 keeps away from the active block 44, the active block 44 is reset along the first guiding groove 422 under an elastic force of the first elastic component 47. At this time, one end of the cantilever 34 is located in the first groove 15 and the second groove 16, and is located below the to-be-detected component 60.

Figure 10:
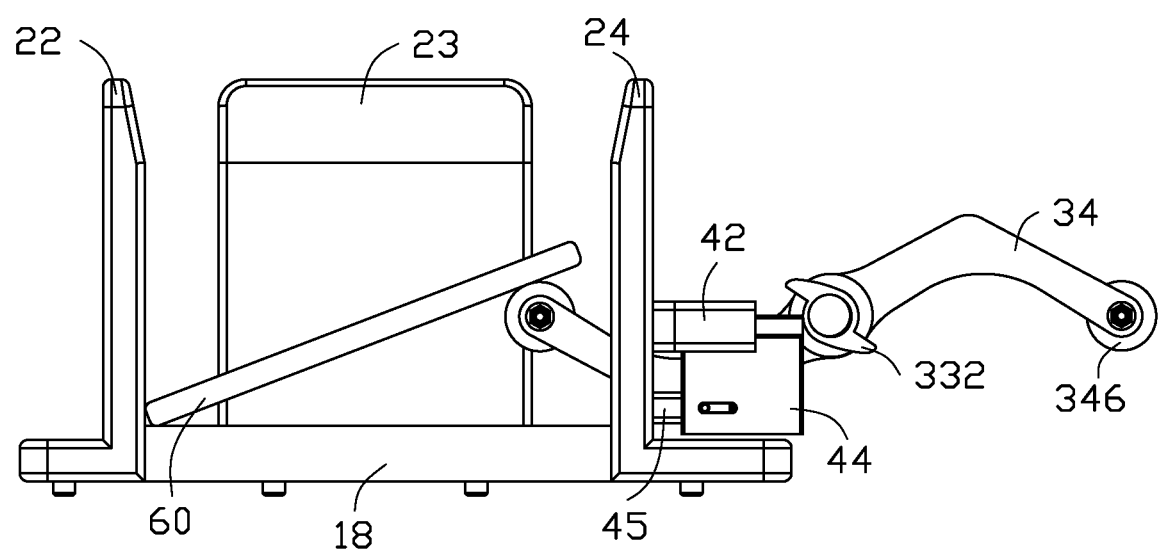
FIG. 10 is a perspective view showing the cantilever lifts the component to be tested after the rotating shaft rotates.

Fourthly, referring to FIG. 10, the rotating shaft 32 continues to rotate until one end of the cantilever 34 contacts and lifts one end of the to-be-detected component 60.

Fifthly, referring to FIG. 11, the rotating shaft 32 continues to rotate, the cantilever 34 continues to rotate with the rotating shaft 32 until one end of the to-be-detected component 60 is lifted to a vertex.

Figure 12:
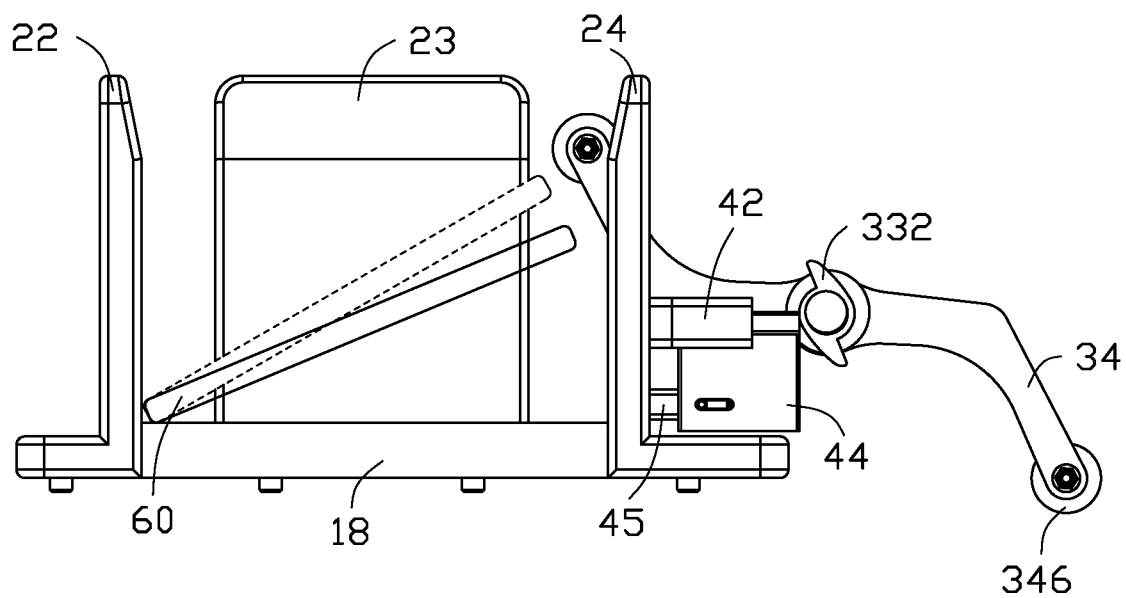
FIG. 12 is a perspective view showing the to-be-detected component falls back after the rotating shaft rotates.
Figure 13:
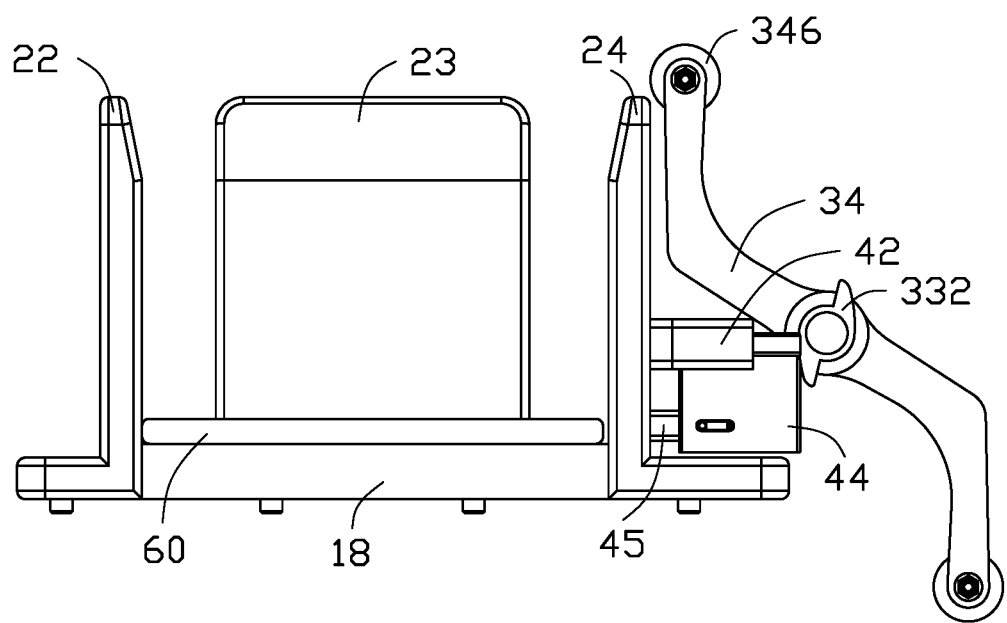
FIG. 13 is a perspective view of the dropping test device after a dropping test is completed.

Sixthly, referring to FIGS. 12-13, the cantilever 34 continues to rotate, and the to-be-detected component 60 falls back to the bottom plate 18. A dropping test is completed.

Seventhly, repeat the above steps to complete multiple dropping tests.

With the embodiments described above, the dropping test device 100 includes a returning assembly 40 for achieving a reference positioning after each falling of the to-be-detected component 60. The cantilever 34 and the cam 33 are fixed on a same rotating shaft 32, so that, a transmission assembly 50 can drive the lifting assembly 30 and the resetting component 40 to operate together. The transmission assembly 50 is an electric drive, which replaces a cylinder drive in a conventional technology, and avoids a need to be additionally connect to a gas path during the dropping test. Meanwhile, the motor 51 has a simple and optimized structure, thereby reducing cost.

The embodiments shown and described above are only examples. Many details are often found in the art such as the other features of a dropping test device. Therefore, many such details are neither shown nor described. Even though numerous characteristics and advantages of the present disclosure have been positioned forth in the foregoing description, together with details of the structure and function of the present disclosure, the disclosure is illustrative only, and changes can be made in the detail, including in matters of shape, size, and arrangement of the parts within the principles of the present disclosure, up to and including the full extent established by the broad general meaning of the terms used in the claims. It will therefore be appreciated that the embodiments described above can be modified within the scope of the claims.

What is claimed is:

1. A dropping test device comprising:
   a base configured for supporting a to-be-detected component;
   a lifting assembly formed on the base; wherein the lifting assembly comprises at least one cantilever, at least one cam, and a rotating shaft; the cantilever and the cam are fixed on the rotating shaft, the rotating shaft drives the cantilever and the cam to rotate, and the cantilever lifts one end of the to-be-detected component during rotating;
   a resetting component abutting on the cam, wherein the cam drives the resetting component towards the to-be-detected component as the cam is rotating; the resetting component drives the to-be-detected component to return to an original position; and
   a transmission assembly connected to the rotating shaft and driving the rotating shaft to rotate.

2. The dropping test device claim 1, wherein the lifting assembly further comprises at least one fixing support fixed on the base, and a through hole defined in the fixing support, the cantilever extends through and is received in the through hole, and the cantilever is rotatable in the through hole.

3. The dropping test device claim 1, wherein a gap is defined in each end of the cantilever, an idler wheel is received in the gap, the idler wheel is connected to the cantilever by a connecting rod, the idler wheel is rotatable along the connecting rod, and the idler wheel contacts and lifts one end of the to-be-detected component.

4. The dropping test device claim 1, wherein the cam comprises two opposite bulges; the two opposite bulges is a centrally symmetric component with the rotating shaft as a center; the cantilever is a centrally symmetric component with the rotating shaft as a center; and a first extending direction of the two opposite bulges is intersected to a second extending direction of the cantilever.

5. The dropping test device claim 4, wherein each of the two opposite bulges comprises an arc surface; each of the two opposite bulges pushes the resetting component by the arc surface to make the to-be-detected component fall back to the initial position.

6. The dropping test device claim 1, wherein the at least one cam and the at least one cantilever are formed with the rotating shaft.

7. The dropping test device claim 1, wherein a first groove is defined in the base, the cantilever is received in the first groove and rotatable in the first groove.

8. The dropping test device claim 1, wherein the base comprises a bearing portion and a bottom plate formed on the bearing portion; the dropping test device further comprises a limiting component fixed on the base and surrounding the bottom plate; the limiting component comprises a plurality of limiting plates, the plurality of limiting plates cooperatively define a receiving space configured to receive the to-be-detected component; and the to-be-detected component formed on the bottom plate.

9. The dropping test device claim 8, wherein the resetting component is located at one side of one of the plurality of limiting plates; the resetting component further comprises a guiding block, an active block, and a pushing block; the guiding block is fixed on the limiting plate; the active block is elastically connected to one of the limiting plate; one end of the pushing block is elastically connected to the active block and the other end of the pushing block is received in the limiting plate; the pushing block is capable of being drove to move in the limiting plate by the active block.

10. The dropping test device claim 9, wherein a first guiding groove is defined in the guiding block, and a portion of the active block is received in and movable towards the limiting plate in the first guiding groove.

11. The dropping test device claim 10, wherein the active block is elastically connected to the limiting plate by a first elastic component; and one end of the first elastic component is fixed in the active block and the other end of the first elastic component is fixed in limiting plate; and the cam pushes the active block to move along the first guiding groove in a first direction, the first elastic component pushes the active block to move in a direction opposite to the first direction.

12. The dropping test device claim 9, wherein a first receiving groove is defined in the active block and faces the limiting plate; a second receiving groove is defined in the limiting plate; the second receiving groove extends through the limiting plate and faces the first receiving groove; a portion of the pushing block is received in the first receiving groove, and the other portion of the pushing block protrudes out of the first receiving groove and is received in the second receiving groove; the pushing block is configured to move with the active block and protrudes from the second receiving groove, thereby pushing the to-be-detected component to an initial position.

13. The dropping test device claim 12, wherein the pushing block is elastically connected to the active block by a second elastic component.

14. The dropping test device claim 12, wherein a second guiding groove is defined in the active block; the second guiding groove extends through the active block and is connected to the first receiving groove; the active block further comprises a limiting rod; the limiting rod penetrates through the pushing block and protrudes out of the pushing block; the limiting rod is perpendicular to a moving direction of the active block; and the limiting rod is received in the second guiding groove and protrudes out of the active block.

15. The dropping test device claim 1, wherein the transmission assembly further comprises a motor and a driving rod connected to the motor; a driven rod is formed on one end of the rotating shaft; the driven rod is connected to the driving rod by a driving belt.

* * * * *